March 2, 1954 G. C. GRAHAM Re. 23,793
PUMP
Original Filed May 28, 1946 4 Sheets-Sheet 1
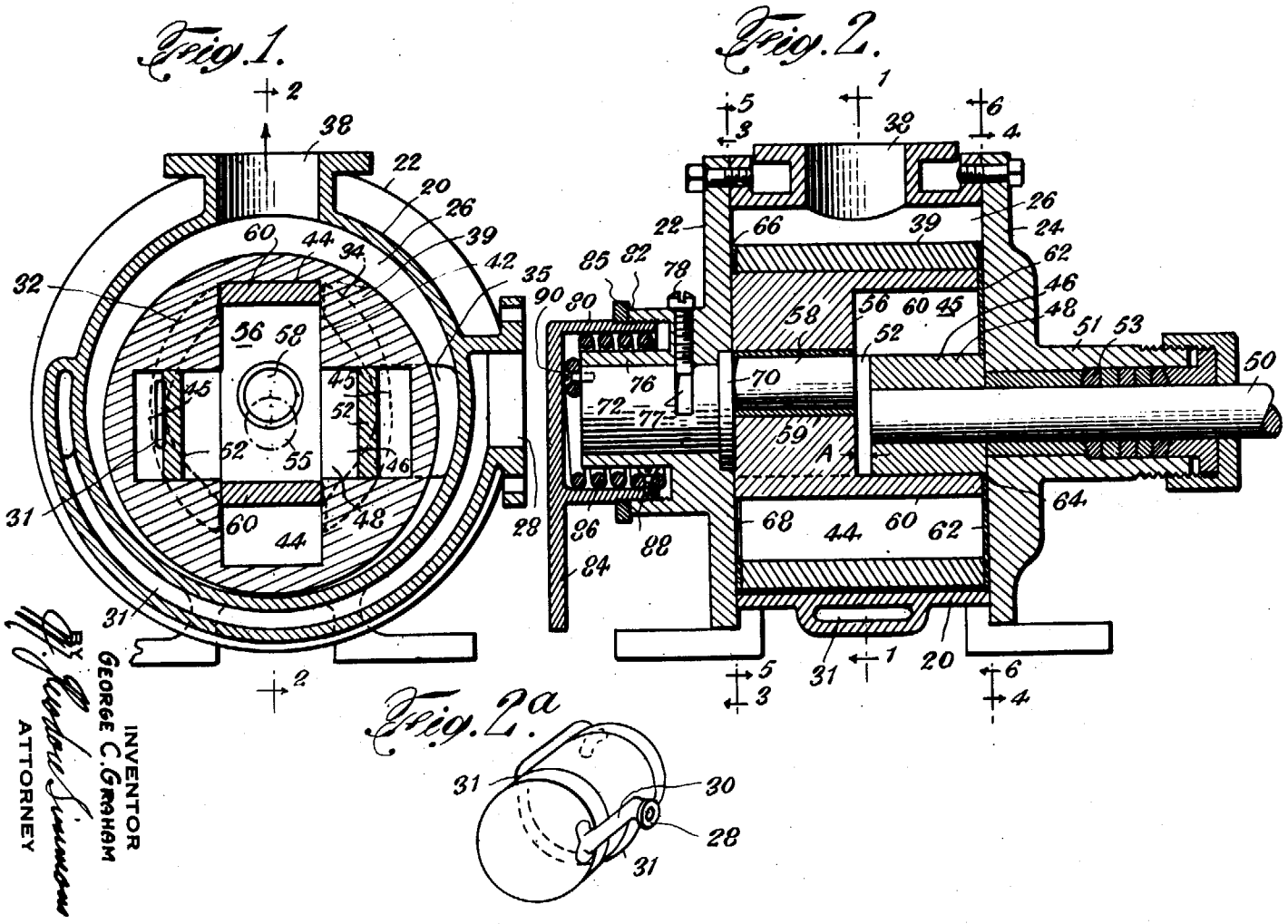
INVENTOR
GEORGE C. GRAHAM
BY
W. Theodore Simmons
ATTORNEY March 2, 1954 G. C. GRAHAM Re. 23,793
PUMP
Original Filed May 28, 1946 4 Sheets-Sheet 2
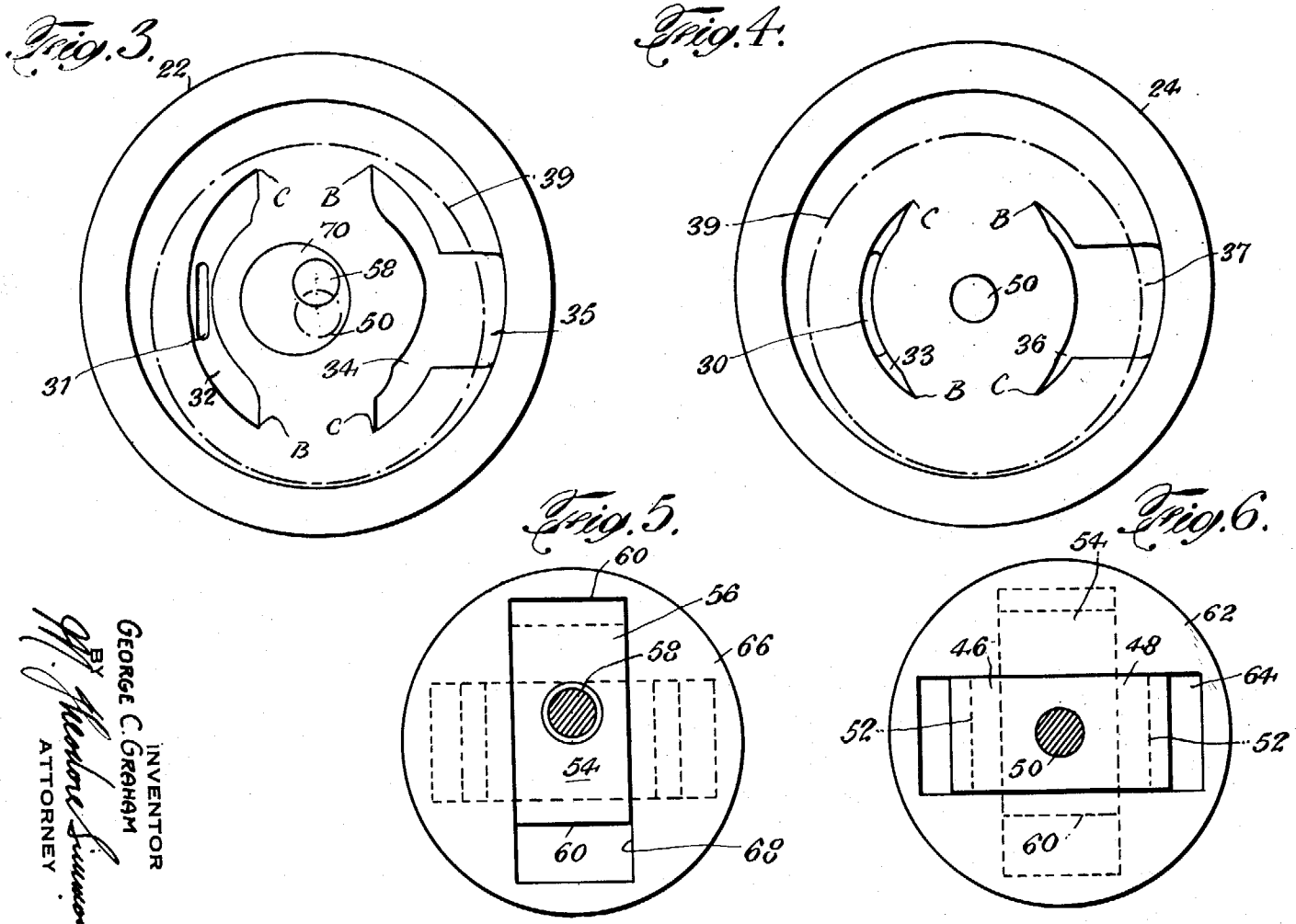
INVENTOR
GEORGE C. GRAHAM
BY M. Theodore Simmons
ATTORNEY March 2, 1954 G. C. GRAHAM Re. 23,793
PUMP
Original Filed May 28, 1946 4 Sheets-Sheet 3
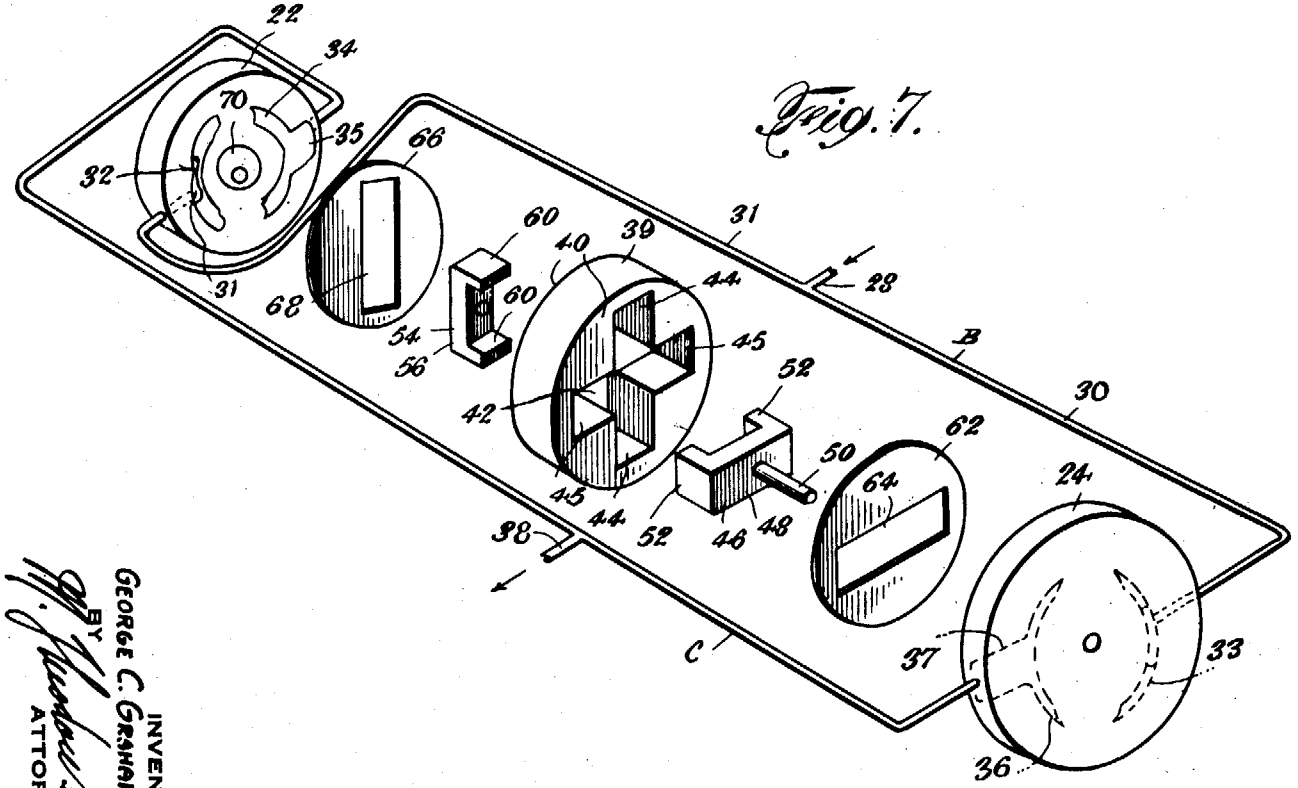
INVENTOR
GEORGE C. GRAHAM
BY
M. Theodore Simmons
ATTORNEY March 2, 1954 G. C. GRAHAM Re. 23,793
PUMP
Original Filed May 28, 1946 4 Sheets-Sheet 4
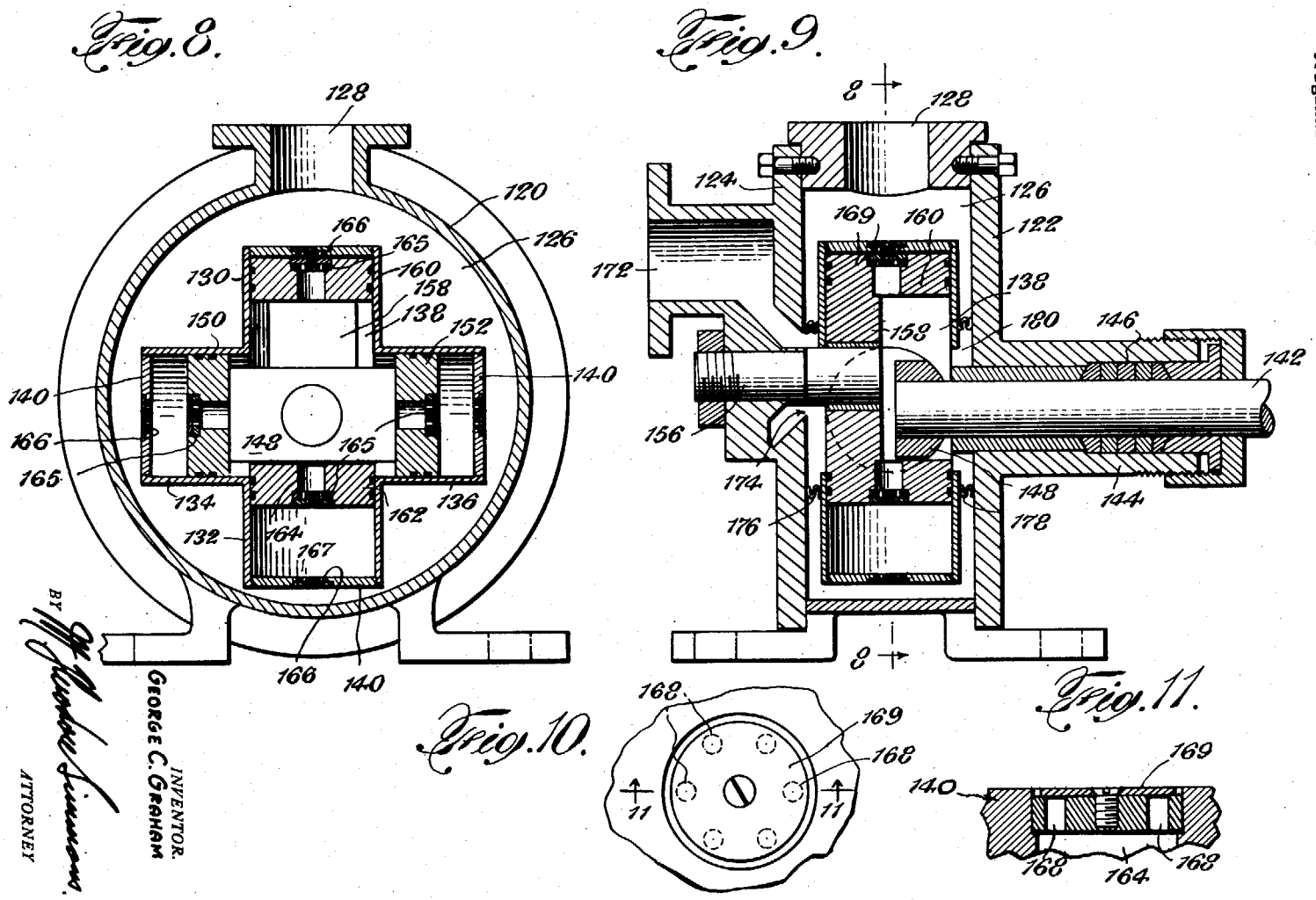
INVENTOR.
GEORGE C. GRAHAM
BY W. Theodore Simmons
ATTORNEY Reissued Mar. 2, 1954

Re. 23,793

UNITED STATES PATENT OFFICE 23,793

PUMP

George C. Graham, Ridgewood, N. J.

Original No. 2,503,257, dated April 11, 1950, Serial No. 672,868, May 28, 1946. Application for reissue April 11, 1951, Serial No. 220,400

28 Claims. (Cl. 103—161)

Matter enclosed in heavy brackets [ ] appears in the original patent but forms no part of this reissue specification; matter printed in italics indicates the additions made by reissue.

The present invention relates to pumps or the like, and particularly to devices of this character operating on the reciprocating piston principle.

An object of the invention is to provide a novel structure of the above indicated character which obtains the piston action or effect by movement of the cylinders relative to the pistons.

Another object of this invention is to provide a reciprocating type of pump which delivers a substantially constant flow of [liquid] *fluid* from its outlet.

Another object of this invention is to provide a novel pump of the variable volume type.

Another object of the invention is to provide a simple control or adjustment of the cylinder strokes relative to the pistons whereby the device, while operating, may deliver any amount of fluid from zero to a maximum.

Another object of the invention is to provide a device having novel mechanical movement, which is adapted for a pump, as in the example shown, and which also may be employed in a compressor, [a gas engine, a steam engine, an air motor, a hydralulic motor] and *perhaps* in other applications.

Another object of the invention is to provide a device of the above indicated character which shall be simple and durable in construction, economical to manufacture, and effective in its operation.

With such objects in view, as well as other advantages which may be incident to a utilization of the improvements, the invention comprises the parts and combinations thereof hereinafter set forth in the drawings, specification and claims, with the understanding that the several necessary elements constituting the same may be varied in proportion, arrangement and texture without departing from the nature and scope of the invention.

To make the invention more readily understood, means are shown in the accompanying drawings for carrying the same into practical effect, without limiting the improvements in the useful applications thereof to the particular constructions which, for purposes of explanation, are made the subject of illustration.

In the drawings:

Fig. 1 is a transverse sectional view of one embodiment of the invention, taken substantially along the lines 1—1 of Fig. 2;

Fig. 2 is a view, partially in longitudinal section and partially in side elevation, taken substantially along the line 2—2 of Fig. 1;

Fig. 2A is a diagrammatic view, in perspective, of the pump illustrating particularly the inlet channels;

Figs. 3 and 4 are inner face views of end casing heads, taken on the lines 3—3 and 4—4, respectively, of Fig. 2;

Figs. 5 and 6 are views taken on the lines 5—5 and 6—6 respectively, of Fig. 2, showing cover plates on a rotor forming part of the structure;

Fig. 7 is a diagrammatic exploded perspective of the parts of the device, omitting the main housing body, but illustrating the fluid circuit;

Figs. 8 and 9 are views similar to Figs. 1 and 2, respectively, of the invention in modified form;

Figs. 10 and 11 are enlarged details respectively in plan and section of the valves of Figs. 8 and 9.

Briefly, the device comprises a revolving cylinder block having the cylinders disposed in cruciform fashion. The double-ended pistons are mounted on separate shafts one of which is adjustable to offset one shaft with respect to the other, and the amount of the eccentricity determines the orbit of the cylinder block and the reciprocation of the cylinders. That is to say, the axis of the cylinder block travels in an orbit the size of which determines the relative eccentric movement of the cylinder block to the pistons and, therefore, the volume of delivery per stroke. As all four cylinders discharge successively into the pump casing, a substantially steady flow is produced. The eccentricity of the shafts can be fixed, in which event the pump will be a constant volume pump, or suitable means may be provided for selectively adjusting the position of the shafts from being co-axial to a predetermined maximum eccentricity thus converting the pump to the variable volume type. Porting to and from the cylinders [is] *may be* arranged in the end plates of the pump housing.

Referring first to the structure shown in Figs. 1 to 7 inclusive, the pump comprises a cylindrical housing 20 closed by end cover plates 22 and 24, thus forming a chamber 26. An inlet connection 28 communicates by means of manifolds external to the casing, indicated at 30 and 31 in Figs. 2 and 2A, with somewhat crescent-shaped inlet depression 32 (Figs. 3 and 7) in the inner face of the end plate 22 and crescent-shaped inlet depression 33 in end plate 24. The face of end plate 22 also is provided with a crescent-shaped outlet depression 34 having an enlarged area 35 extending from one side thereof and the face of end plate 24 also is provided with a crescent-shaped outlet 36 having an enlarged area 37, the enlarged areas being of a size and disposition as to be at all times in communication with the chamber 26 of the housing, as hereinafter more fully explained. A main outlet 38 leads from the chamber 26.

The cylinder block 39 in this form of the invention, is a simple rotor having plane end surfaces 40 at right angles to the rotor axis, and a cruciform axial opening 42 entirely therethrough forming a pair of oppositely disposed cylinder portions 44 and a second pair of oppositely disposed cylinder portions 45. The cylinder portions are of rectangular or polygonal cross sectional area. The cross section, in this case, is rectangular for facility of milling straight through the rotor.

A piston element 46, of substantially U-shape, has a cross piece 48, fixed to a drive shaft 50, and inwardly extending legs 52 forming piston-head elements operating in the cylinders 45. The shaft 50 is journaled in a bearing portion 51 of the cover plate 24 and having a stuffing box construction 53 therein. It will be noted that the axis of the shaft does not coincide with the axis of chamber 26.

A second piston element 54, also of substantially U-shape, has a cross piece 56, which is rotatably mounted on a shaft or trunnion 58, through the intermediary of a bearing sleeve 59, and has inwardly extending legs 60 forming piston head elements operating in cylinders 44.

One side of the cylinder portions 44 are closed by a thiin shield or disc 62, secured to one end face of the rotor 39, and having a diametral rectangular through opening 64 in register with the cylinder portions 45. Another thin shield or disc 66 is secured to the opposite face of the rotor so as to close one side of cylinder portions 45, and having a similar opening 68 in register with cylinder portions 44.

When assembled, the piston element 46 fits in the cylinder block 39 so that the piston elements 52 are in the cylinder portions 45 with the outer end of the cross piece 48 extending into the slot 64 of the disc 62, and the piston element 54 is assembled in the opposite side of the cylinder block so that the piston elements 60 are in the cylinder portions 44 and the outer end of the cross piece 56 extends into the slot 68 in the cover disc 66. With this arrangement the cylinder block is freely mounted so as to reciprocate with respect to the piston elements, as will be described.

The slots 64 and 68 are of a size to register with the crescent-shaped portions of the inlet and outlet depressions *32, 33, 34, 36, respectively,* [32 to 36] in the end plates 22 and 24 as the cylinder block 39 revolves in the main housing and, as will be apparent, as one of the cylinders 45 is discharging into the outlet 36 of end plate 24, the opposite cylinder 45 is on the suction stroke, being in communication with the inlet 33. Similarly, the cylinders 44 are on the compression and suction strokes in communication with the depressions 32 and 34 of end plate 22, but these actions take place 90° out of phase with the corresponding actions of the cylinders 45. The only times when the slots 64 and 68 are not in communication with the depressions *32, 33, 34, 36, respectively,* [32 to 36] of the respective end plates is when the respective slots are in the vertical position (of Figs. 1–7), in which position the crescent-shaped depressions are spaced apart slightly more than the width of the piston elements. The derivation of the crescent-shaped depressions [32 to 36] *32, 33, 34, 36, respectively,* and their locations on the end plates will be explained hereinafter.

It will be noted, that during the assembly of the apparatus, the piston elements 46 and 54, are moved toward each other, from the positions of Fig. 7, into the cruciform opening of the rotor [36] *39* until the cross pieces 48 and 56 are close to each other, separated as by a distance A, Fig. 2, and the piston heads 52 of the element 46 axially overlap the piston heads 60 of the element 54, and vice versa.

It has been explained that piston element 46 is fast on drive shaft 50 and that piston element 54 is mounted on a trunnion 58. Referring to Fig. 2, the trunnion 58 is adjustably mounted through the intermediary of a flange 70 on the inner end of a shaft 72 which is rotatably mounted in a bearing sleeve 76 in the cover plate 22. Shaft 72 has a peripheral slot 77, and the flattened end of a screw 78, fixed in sleeve 76, engages in said slot. In the position shown in Fig. 2 the shafts 50 and 58 have their maximum eccentricity, and the screw is at one end of slot 77. When shaft 72 is turned, by any suitable means, the axes of shafts 50 and 59 [are] *may be* aligned at an intermediate position of the pin in the slot [.] *or with the pin at the opposite end of the slot from the aforesaid maximum position.* The apparatus may be so arranged by enlarging the casing 26 and extending slot 77 past the zero position at the present end of the slot that the whole pump action will be reversed, as will be understood. Any suitable means may be provided for clamping the shaft 72 in the selected position. In the showing of Fig. 2 this is combined with an automatic regulator of the reaction type, the mechanism of which will be described, and subsequently, its mode of operation.

A cap 80, screw threaded in a sleeve 82 of the cover plate 22, has a handle 84, and is fixed in its adjusted positions by means of lock nut 85. One end of a coiled spring 86 is secured to the cap 80, as by a screw 88, and the other end is secured to the shaft 72 as by a screw 90. A balance between the pressure of the liquid and the pressure exerted by the spring 86 determines the eccentricity of the shafts 50 and 58.

As shown in Fig. 2, and as seen from a comparison of Figs. 3 and 4, the drive shaft 50, the trunnion 58 and the shaft 72, are each eccentric to the others, and when the trunnion 58 is in its position of maximum eccentricity relative to the drive shaft 50, which is the position of maximum pumping capacity of the device, the axes of the trunnion 58 and shaft 50 are not in the same vertical plane. Furthermore, none of the axes need to or do coincide with the axis of chamber 26.

As a result of the eccentric mounting of the trunnion 58 and shaft 50, the cylinder block 39 is caused to both rotate and revolve in an orbit to produce pumping strokes between the pistons and cylinders. That is to say, with the parts assembled as described, as the drive shaft 50 is rotated the piston element 46 rotates with the shaft, and if we ignore for the moment the presence of the other piston element 54 it is clear that the cylinder block 39 will merely rotate about the axis of the shaft 50, and there will be no relative displacement of piston and cylinder block and hence no pumping action. Likewise, if the axes of shaft 50 and trunnion 58 are aligned, all parts will rotate on a common axis and still there will be no pumping action. As soon as the trunnion 58 is displaced from axial alignment with the shaft 50, the rotative effort of the cylinder block tends to divide between the displaced axes and to rotate the cylinder block about a new axis. Since this is not possible physically, the turning force exerted by the displaced piston element 54 is converted into lateral motion which physically moves the cylinder block 39 transversely of its axis with the piston element 46 acting as a guide.

Starting from a position in which piston element 46 is in mid-position in the cylinders 45 and the piston element is in its uppermost position in Fig. 7, upon a 90° rotation of the cylinder block the relative eccentricity of the piston elements 46 and 54 with respect to the cylinder block has altered so that the center of rotation of the cylinder block more nearly coincides with the axis of the trunnion 58, and the cylinder block has completed its movement to the right where piston element 46 is at one limit of its stroke and piston element 54 is in its mid-position. In the course of the next 90° of rotation, the axis [or] *of* rotation of the cylinder block approaches that of the shaft 50, but now the cylinder block has moved toward the left so that piston element 46 is in its mid position and piston element 54 is at the opposite or lower limits of its stroke. With the third 90° rotation the cylinder block has moved so piston element 46 has reached the opposite limit of its stroke and upon the final 90° rotation the parts have returned to the starting position. As the rotation of the cylinder block is continuous, the resultant of these forces is to cause the axis of the cylinder block to describe a complete orbit while the piston elements rotate about fixed axes. Thus, a reciprocatory movement occurs between the cylinder block and the piston elements which reverses as to each piston element in each half revolution of the cylinder block, and by reason of the piston elements being displaced 90° with respect to each other, the pumping strokes successively reach their maximum limits 90° out of phase.

As the cylinder block rotates each cylinder 44 and 45 successively registers with its associated inlet and outlet depressions *32, 33, 34, 36, respectively* [32 to 36], through the slots 68 and 64 respectively, such registrations being timed with the suction and compression strokes respectively. Thus, while one of the cylinders 44 is on its suction stroke (and in register through slot 68 with inlet 32 of end plate 22) the opposite cylinder 44 is on its compression stroke (and in register through slot 68 with outlet 34 of end plate 22). Likewise, 90° out of phase with the foregoing operations, while one of the cylinders 45 is on its suction stroke (and in register through slots 64 with inlet 33 of end plate 24) the opposite cylinder 45 is on its compression stroke (and in register through slot 64 with outlet 36 of end plate 24).

The so-called crescent-shape of the depressions *32, 33, 34, 36, respectively,* [32 to 36] is derived by coincidence with the paths of the rotating pistons and cylinders, the terminus B (Figs. 3 and 4) of each coinciding with the locations of the pistons at the start of their respective suction and compression strokes, and the terminus C coinciding with the locations of the pistons at the finish of those strokes. The depressions widen from points B toward their centers and then reduce in width toward points C with the opening and closing of the cylinders respectively, the size, location and shapes of the depressions being chosen to provide maximum pump efficiency and capacity.

It will be noted that the depressions 32 and 34 in end plate 22 are considerably wider than the corresponding inlet and outlet depressions 33 and 36 in end plate 24, the reason being that when the control mechanism is adjusted to offset the drive shaft 50 and trunnion 58, there is a corresponding displacement of the cylinder block or of pistons 52, as will be described, which displacement alters the orbits of the pistons, proportional to the amount of the lateral displacement.

The outlet depressions 34 and 36 are provided respectively with central enlargements 35 and 37, extending substantially to the edge of the chamber 26, because the crescent-shaped portions of the outlet depressions are within the orbit of the cylinder block and hence covered by the discs 62 and 66. The enlargements 36 extend outside the orbit of the cylinder block so that the fluid discharged from the cylinders 44 and 45 enters the chamber 26, from which it passes through the outlet 38. It should be noted that the orbit of the cylinder block does not touch the cylindrical casing at any point in the construction thus far described.

As stated above, this device has the greatest pumping capacity when the trunnion 58 has the position of Figs. 1 and 2 relative to the drive shaft 50. To vary the pump capacity, or in other words, to shorten the cylinder strokes, it is only necessary to turn the handle 84, which will gradually diminish the eccentricity of the trunnion 58 to the drive shaft 50 from the position of maximum eccentricity shown, to a position of zero eccentricity wherein the axes of the trunnion and the drive shaft are concentric or in line. In the latter position, there is no piston action, but only idle rotation of all the rotatable parts. If the handle 84 is placed in any position in which the screw 78 is intermediate the ends of slot 77, the degree of eccentricity and the pump capacity will be in accordance with the handle position.

It will be understood that rotation of shaft 72 to offset the axes of shaft 50 and trunnion 58 actually displaces the piston so as to bring one set of the pistons 52 or 60 at the limit or near the limit of the pumping strokes. By doing this, an eccentricity is introduced in the relationship of the cylinders, and one or two of the cylinders, is in communication with one or both of the outlet depressions 34 and 36. Since the cylinder block is entirely free, the back pressure on the piston elements 46 and 54 is in the opposite direction to the force exerted by the coil spring 86. If the pressure of the coil spring is overcome by the back pressure of the fluid system, the cylinder block is moved automatically in a direction to reduce the eccentric relationships; and oppositely, so long as the back pressure is less than the force exerted by spring 86, the eccentric relationships will be maintained in the maximum position to which they had been adjusted.

Referring to the form shown in Figs. 8 to 11, where the same principles are applied as hereinbefore described, the pump comprises a cylindrical casing 120 closed by end plates 122 and 124, forming a chamber 126, and provided with an outlet connection 128. The cylinder block in this instance comprises four cylinders joined in cruciform shape with cylinders 130 and 132 disposed oppositely to each other and cylinders 134 and 136 disposed oppositely to each other and displaced 90° with respect to the cylinders 130 and 132. The cylinders are joined together at their lower ends to form a central chamber 138 and each of the cylinders is closed by a suitable head 140.

A drive shaft 142 is rotatably mounted in a sleeve bearing 144 on end plate 122, and in which is a suitable packing gland 146. The shaft 142 extends into the cylinder block and at its inner end has secured thereto a cross piece 148 on the opposite ends of which are piston heads 150 and 152 respectively fitting in and cooperating with the cylinders 134 and 136. A stub shaft 156 is mounted in end plate 124, with its inner end projecting into the chamber 138 of the cylinder block and forming a trunnion for a cross piece 158, which has on its opposite ends piston heads 160 and 162 respectively operating in cylinders 130 and 132.

Each of the piston heads 150, 152, 160 and 162 is provided with an opening 164 which establishes communication between the central chamber 138 of the cylinder block and the respective cylinders 134, 136, 130 and 132. Each of the openings 164 is closed by a feather or other type valve mechanism indicated at 165, and adapted to open to permit flow from the chamber 138 into each of the cylinders and to close automatically, either under spring action or by back pressure, to prevent flow in the opposite direction. Likewise, each of the cylinder heads 140 has a port 166, which also may be closed by a feather or other type of valve mechanism, indicated at 167, and adapted to establish communication from the interior of the respective cylinders to the chamber 126, but preventing flow in the opposite direction.

The valve mechanisms 165 and 167 may be alike in construction and one form thereof is shown in detail in Figs. 10 and 11. The valve body is in the form of a plug fitting the respective ports and openings, and is provided with a plurality of apertures 168 which are covered by a thin flexible plate 169 fastened at its center to the valve body.

It will be noted that the cylinder block is freely suspended in the casing 126, as well as on the piston elements. One set of the piston elements is fast upon the drive shaft 142 and the other set is pivotally mounted on the trunnion 156. When the axis of the trunnion is offset from the axis of the drive shaft 142 so that, in the position shown in the drawings, piston heads 160 and 162 are respectively at the limits of their compression and suction strokes while piston heads 150 and 152 are midway in their respective cylinders, rotation of the drive shaft rotates the pistons and causes the cylinder block to describe a complete orbit the result of which is to move the cylinders with respect to the piston heads to [successfully] *successively* expand and contract the cylinder spaces to produce suction and compression pumping strokes.

The chamber 126 is provided with an inlet connection 172 which opens into the chamber 126 through the inlet opening 174 in end plate 124, which inlet opening surrounds the trunnion 156 and is opposite the open chamber 138 of the cylinder block. The space between the cylinder block and the end plate 124 is closed by any suitable means, such as the Sylphon bellows washer 176, which is secured to the cylinder block so as to close its central chamber 138 on the side adjacent the end plate 124. On the opposite side the cylinder block also is provided with a Sylphon bellows type of washer 178 which surrounds the opening into the chamber 138 and fills the space between the cylinder block and the end plate 122. The Sylphon washers 176 and 178 form an auxiliary closed chamber 180 within the chamber 126, and being attached to the cylinder block so as to move therewith. Accordingly, they must be of a size to allow for the orbital movement of the cylinder block so that this chamber 180 is never out of communication with the inlet opening 174.

The chamber 138 of the cylinder block is at all times in open communication with the auxiliary chamber 180 so that there is fluid behind each of the cylinder heads. As the cylinder block is moved to expand the space of one of the cylinders, a suction stroke, the valve 166 thereof opens to admit fluid from the chamber 138 into the particular cylinder. At the end of the suction stroke the compression stroke begins whereupon the valve 166 closes and the valve 170 in the cylinder head opens so that fluid is forced out of the cylinder into the chamber 126, from which it flows through the outlet opening 128.

Other modifications may be made in the arrangement and location of parts within the spirit and scope of my invention.

I claim:

1. In a [hydraulic] *fluid handling* device, the combination of means including a rotatable member forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, and inlet and outlet connections to said cylinders.

2. In a hydraulic device, the combination of means including a rotatable member forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons of said first shaft through the intermediary of said rotatable member and to drive the latter through the intermediary of the drive shaft pistons to provide the piston effect by movement of the cylinders relative to the pistons, means for varying the degree of eccentricity between said shafts, and inlet and outlet connections to said cylinders.

3. In a [hydraulic] *fluid handling* device, the combination of means including a rotatable member forming a plurality of pairs of radially opposite cylinders, a shaft supporting at least one pair of opposed pistons for a corresponding pair of said cylinders, a drive shaft eccentric to said first shaft carrying at least one pair of opposed pistons for another pair of said cylinders and operative to drive the pistons of said first shaft through the intermediary of said rotatable member and to drive the latter through the intermediary of the drive shaft pistons whereby the spaces of opposed cylinders are oppositely and alternately contracted by movement of the cylinders relative to the pistons, and inlet and outlet connections to said cylinders.

4. In a hydraulic device, the combination of means including a rotatable member forming a plurality of pairs of radially opposite cylinders, a shaft supporting at least one pair of opposed pistons for a corresponding pair of said cylinders, a drive shaft eccentric to said first shaft carrying at least one pair of opposed pistons for another pair of said cylinders and operative to drive the pistons of said first shaft through the intermediary of said rotatable member and to drive the latter through the intermediary of the drive shaft pistons whereby the piston effect is obtained by movement of the cylinders relative to the pistons, means for varying the degree of eccentricity between said shafts, and inlet and outlet connections to said cylinders.

5. In a [hydraulic] *fluid handling* device, the combination of means including a rotatable member forming a plurality of cylinders of polygonal cross sectional contour, a shaft supporting one or more piston elements of corresponding contour for a corresponding number of said cylinders, a drive shaft eccentric to said first shaft carrying one or more pistons of corresponding contour for a corresponding number of other of said cylinders and operative to drive the piston or pistons of said first shaft through the intermediary of said rotatable member and to drive the latter through the intermediary of the drive shaft pistons to provide the piston effect by movement of the cylinders relative to the pistons, and inlet and outlet connections to said cylinders.

6. In a [hydraulic] *fluid handling* device, the combination of a housing forming a chamber having parallel inner end surfaces, means including a rotatable member in said chamber having parallel ends and *having* a substantially cruciform *axial* opening [axially therethrough] cooperating with said inner end chamber surfaces to form a piston cylinder of each leg of said cruciform opening and of rectangular cross section, a shaft parallel to said opening supporting an element of substantially U-shape, the legs of which U-shaped element form pistons in diametrically opposed relation in said cylinders, a drive shaft eccentric to said first shaft also carrying an element of substantially U-shape, the legs of which form pistons in the remaining of said cylinders, said drive shaft operating to drive the pistons of said first shaft through the intermediary of the drive shaft pistons whereby the piston effect is provided by movement of the cylinders relative to the pistons, and inlet and outlet connections to said cylinders.

7. In a [hydraulic] *fluid handling* device, the combination of a housing forming a chamber having [axially] opposite bearing portions eccentric relative to each other, shafts including a driving shaft and a second shaft journaled in said bearings, respectively, a member rotatable in said chamber, said member also revolving about an axis substantially parallel to the axes of said bearing portions and having a plurality of pairs of cylinders, the cylinders of each pair being spaced substantially radially from each other at opposite sides of the axis of said rotatable member and having axes disposed at an angle to the axes of the other cylinder pairs, pistons in the cylinders of certain of said pairs and carried by said driving shaft, pistons in the cylinders of the other cylinder pairs mounted for rotation about the axis of the second shaft, the arrangement operating said rotatable member by the driving shaft through the intermediary of said pistons whereby the rotatable member causes the piston effect by movement of the cylders relative to the pistons, and inlet and outlet connections to said cylinders.

8. In a [hydraulic] *fluid handling* device, a cylindrical casing, end plates closing said casing, the inner faces of the end plates being provided with spaced apart substantially crescent-shaped inlet and outlet depressions, inlet openings into said inlet depressions, a connection from the outlet depressions to the interior of said casing, a main outlet from said casing, a rotatable and revolving cylinder block in said casing and having pairs of opposed cylinders, a drive shaft mounted in one of said end plates, a piston element secured to said drive shaft and having opposed piston heads operating in one pair of said cylinders, a trunnion mounted in the opposite end plate of the casing, a piston element rotatable thereon and having opposed piston heads operating in another pair of said cylinders, the axes of the shaft and trunnion being eccentric with respect to each other, and ported *end* discs *for said cylinder block* in the space between the sides of said cylinder block and the end plates and arranged to successively port said cylinders to the inlet and outlet depressions, respectively.

9. In a [hydraulic] *fluid handling* device, a cylindrical casing, end plates closing said casing, the inner faces of the end plates being provided with substantially crescent-shaped inlet and outlet depressions, an inlet opening into said inlet depression, a connection from the outlet depression to the interior of said casing, a main outlet from said casing, a rotatable and revolving cylinder block in said casing and having pairs of opposed cylinders, a drive shaft mounted in one of said end plates, a piston element secured to said drive shaft and having opposed piston heads operating in one pair of said cylinders, a trunnion mounted in the opposite end plate of the casing, a piston element rotatable thereon and having opposed piston heads operating in another pair of said cylinders, the axes of the shaft and trunnion being eccentric with respect to each other, and ported discs closing said cylinder block and arranged to successively port said cylinders to the inlet and outlet depressions, respectively.

10. In a [hydraulic] *fluid handling* device, a cylindrical casing, end plates closing said casing, the inner faces of the end plates being provided with spaced apart inlet and outlet depressions, inlet openings into said inlet depressions, a connection from the outlet depressions to the interior of said casing, a main outlet from said casing, a rotatable and revolving cylinder block in said casing and having pairs of cylinders, a drive shaft mounted in one of said end plates, a piston element secured to said drive shaft and having piston heads operating in one pair of said cylinders, a trunnion mounted in the opposite end plate of the casing, a piston element rotatable thereon and having piston heads operating in another pair of said cylinders, the axes of the shaft and trunnion being eccentric with respect to each other, and ported discs closing said cylinder block and arranged to successively port said cylinders to the inlet and outlet depressions, respectively.

11. In a [hydraulic] *fluid handling* device, a cylindrical casing, end plates closing said casing, inlet and outlet openings, a rotatable and revolving cylinder block in said casing and having pairs of opposed cylinders, a drive shaft mounted in one of said end plates, a piston element secured to said drive shaft and having opposed piston heads operating in one pair of said cylinder, a trunnion mounted in the opposite end plate of the casing, a piston element rotatable thereon and having opposed piston heads operating in another pair of said cylinders, the axes of the shaft and trunnion being eccentric with respect to each other, whereby the movements of the cylinder block successively expand and contract the spaces in said cylinders, and means for alternately establishing communication between each of said cylinders and said inlet and outlet openings.

12. In a [hydraulic] *fluid handling* device, a cylindrical casing, end plates closing said casing, inlet and outlet openings, a rotatable and revolving cylinder block in said casing and having pairs of opposed cylinders, a drive shaft mounted in one of said end plates, a piston element secured to said drive shaft and having opposed piston heads operating in one pair of said cylinders, a trunnion mounted in the opposite end plate of the casing, a piston element rotatable thereon and having opposed piston heads operating in another pair of said cylinders, the axes of the shaft and trunnion being eccentric with respect to each other, whereby the movements of the cylinder block successively expand and contract the spaces in said cylinder, and ported discs located on each side of said cylinder block and arranged to successively port said cylinders to the inlet and outlet openings.

13. In a hydraulic device, a cylindrical casing, end plates closing said casing, inlet and outlet openings, a rotatable and revolving cylinder block in said casing and having pairs of opposed cylinders, a drive shaft mounted in one of said end plates, a piston element secured to said drive shaft and having opposed piston heads operating in one pair of said cylinders, a trunnion mounted in the opposite end plate of the casing, a piston element rotatable thereon and having opposed piston heads operating in another pair of said cylinders, the axes of the shaft and trunnion being eccentric with respect to each other, whereby the movements of the cylinder block successively expand and contract the spaces in said cylinders, means for alternately establishing communication between each of said cylinders and said inlet and outlet openings, an adjustable mounting for the trunnion comprising a rotatable member, means for rotating said member to alter the eccentricity between the driving shaft and trunnion, and means for locking the adjusting means in the adjusted position.

14. In a hydraulic device, a cylindrical casing, end plates closing said casing, the inner faces of the end plates being provided with spaced apart substantially cresent-shaped inlet and outlet depressions, inlet openings into said inlet depressions, a connection from the outlet depressions to the interior of said casing, a main outlet from said casing, a rotatable and revolving cylinder block in said casing and having pairs of opposed cylinders, a drive shaft mounted in one of said end plates, a piston element secured to said drive shaft and having opposed piston heads operating in one pair of said cylinders, a trunnion mounted in the opposite end plate of the casing, a piston element rotatable thereon and having opposed piston heads operating in another pair of said cylinders, the axes of the shaft and trunnion being eccentric with respect to each other, an adjustable mounting for the trunnion comprising a rotatable member, means for rotating said member to alter the eccentricity between the driving shaft and trunnion, means for locking the adjusting means in the adjusted position, and ported discs in the space between the sides of said cylinder block and the end plates and arranged to successively port said cylinders to the inlet and outlet depressions, respectively.

15. In a hydraulic device, a cylindrical casing, end plates closing said casing, inlet and outlet openings, a rotatable and revolving cylinder block in said casing and having pairs of opposed cylinders, a drive shaft mounted in one of said end plates, a piston element secured to said drive shaft and having opposed piston heads operating in one of said pairs of cylinders, a second shaft rotatably mounted in the opposite end plate of the casing, a trunnion mounted on the second shaft and movable from a position in which the axes of the driving shaft and trunnion are aligned to selected positions in which the axes of the driving shaft and trunnion are eccentric with respect to each other, a piston element rotatable on the trunnion and having opposed piston heads operating in another pair of said cylinders, the eccentric adjustment of the trunnion also effecting an eccentric relationship between the respective piston elements, means for adjusting the second shaft, a spring connected between said shaft and said adjusting means, means for locking the adjusting means in adjusted positions, and means for alternately establishing communication between each of said cylinders and said inlet and outlet openings, whereby the fluid pressure is automatically balanced against the pressure of said spring to maintain the output of said device at a substantially constant pressure.

16. In a hydraulic device, a cylindrical casing, end plates closing said casing, inlet and outlet openings, a rotatable and revolving cylinder block in said casing and having pairs of cylinders therein, a drive shaft mounted in one of said end plates, a piston element secured to said drive shaft and having piston heads operating in one of said pairs of cylinders, a trunnion, means for pivotally mounting the trunnion in the opposite end plate of the casing so as to be movable from a position in which the axes of the driving shaft and trunnion are aligned to selected positions in which the axes of the driving shaft and trunnion are eccentric with respect to each other, a piston element rotatable on the trunnion and having piston heads operating in another pair of said cylinders, the eccentric adjustment of the trunnion also effecting an eccentric relationship between the respective piston elements, means for adjusting the trunnion mounting means, pressure reactive means between said mounting means and said adjusting means, and means for alternately establishing communication between each of said cylinders and said inlet and outlet openings whereby the fluid pressure is automatically balanced against the pressure of said reactive means to maintain the output of said device at a substantially constant pressure.

17. In a [hydraulic] *fluid handling* device, the combination of a casing, end plates closing said casing, an outlet therefrom, a drive shaft mounted in one of said end plates, a trunnion mounted in the other of said end plates, the axes of the shaft and trunnion being offset from each other, a cylinder block having a plurality of pairs of opposed cylinders therein and a central inlet chamber, the free ends of the shaft and trunnion extending into said chamber, a piston element secured to the free end of said drive shaft and having a pair of opposed piston heads operating in one pair of said cylinders, a second piston element which is mounted on the free end of said trunnion and has a pair of opposed piston heads operating in another pair of said cylinders, whereby rotation of the drive shaft and its piston element will rotate and revolve the cylinder block, an auxiliary chamber in said casing in communication with the inlet chamber of the cylinder block, an inlet opening in the casing and to said auxiliary chamber, ports in each of said piston heads establishing communication between the inlet chamber and the space in each of said cylinders, valve means controlling each of said ports, an outlet port in each of said cylinders opening into said casing, and valve means controlling the port in each of said cylinders.

18. In a [hydraulic] *fluid handling* device, the combination of a casing, end plates closing said casing, an outlet therefrom, a drive shaft mounted in one of said end plates, a trunnion mounted in the other of said end plates, the axes of the shaft and trunnion being offset from each other, a cylinder block having a plurality of pairs of cylinders therein and an inlet chamber, the free ends of the shaft and trunnion extending into said cylinder block, a piston element secured to the free end of said drive shaft and having a pair of piston heads operating in one pair of said cylinders, a second piston element which is mounted on the free end of said trunnion and has a pair of piston heads operating in another pair of said cylinders, whereby rotation of the drive shaft and its piston element will rotate and revolve the cylinder block, a washer carried by said cylinder block and cooperating with said casing to form an auxiliary chamber therein in communication with the inlet chamber of the cylinder block, an inlet opening to said auxiliary chamber, ports in each of said piston heads establishing communication between the inlet chamber and the space in each of said cylinders, valve means controlling each of said ports, an outlet port in each of said cylinders opening into said casing, and valve means controlling the port in each of said cylinders.

19. In a [hydraulic] *fluid handling* device, the combination of a casing, end plates closing said casing, an outlet therefrom, a drive shaft mounted in one of said end plates, a trunnion mounted in the other of said end plates, the axes of the shaft and trunnion being offset from each other, a cylinder block having a plurality of pairs of cylinders therein and an inlet chamber, the free ends of the shaft and trunnion extending into said cylinder block, a piston element secured to the free end of said drive shaft and having a pair of piston heads operating in one pair of said cylinders, a second piston element which is mounted on the free end of said trunnion and has a pair of piston heads operating in another pair of said cylinders, whereby rotation of the drive shaft and its piston element will rotate and revolve the cylinder block, an inlet opening in said casing and connected to said chamber, ports in each of said piston heads establishing communication between the inlet chamber and the space in each of said cylinders, valve means controlling each of said ports, an outlet port in each of said cylinders opening into said casing, and valve means controlling the port in each of said cylinders.

20. In a [hydraulic] *fluid handling* device, an enclosing casing, inlet and outlet openings therein, a cylinder block movable in said casing and having pairs of opposed cylinders, a drive shaft mounted in said casing, a piston element mounted on said drive shaft and having opposed piston heads operating in one pair of said cylinders, a second shaft mounted in said casing, a piston element connected to said second shaft and having opposed piston heads operating in another pair of said cylinders, the axes of said shafts being eccentric with respect to each other, whereby the movements of the cylinder block successively expand and contract the spaces in said cylinders, and means for alternately establishing communication between each of said cylinders and said inlet and outlet openings.

21. In a hydraulic device, a casing, inlet and outlet openings therein, a cylinder block movable in said casing and having pairs of opposed cylinders, a drive shaft mounted in said casing, a piston element secured to said drive shaft and having opposed piston heads operating in one pair of said cylinders, a second shaft, an adjustable mounting for said second shaft and arranged to adjust the relationship of said shafts between a substantially coaxial relationship and a predetermined eccentricity of said shafts, means for maintaining the shafts in the adjusted relationship, a piston element mounted on said second shaft and having opposed piston heads operating in another pair of said cylinders, whereby the movements of the cylinder block successively expand and contract the spaces in said cylinders, and means for alternately establishing communication between each of said cylinders and said inlet and outlet openings.

22. In a hydraulic device, a casing, inlet and outlet openings therein, a cylinder block movable in said casing and having pairs of opposed cylinders, a drive shaft mounted in said casing, a piston element mounted on said drive shaft and having opposed piston heads operating in one of said pairs of cylinders, a second piston element having opposed piston heads operating in another of said pairs of cylinders, an adjustable mounting for said second piston elements to effect an eccentric relationship between the respective piston elements and including an adjustable pressure reactive element, and means for alternately establishing communication between each of said cylinders and said inlet and outlet openings, whereby the fluid pressure is automatically balanced against the pressure reactive element to maintain the output of said device at a substantially constant pressure.

*23. In a fluid handling device, a casing, end plates for said casing, the inner faces of the end plates being provided with substantially crescent-shaped inlet and outlet depressions, means in said casing including a rotatable member forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, means for alternately establishing communication between each of said cylinders and said inlet and outlet depressions, and inlet and outlet connections to said depressions.*

*24. In a fluid handling device, a casing having a peripheral wall and a pair of end plates, the inner faces of the end plates being provided with substantially crescent-shaped inlet and outlet depressions, means in said casing including a rotat-*

*able member of less diameter than said casing and forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, said member rotating out of contact with said peripheral wall, means for alternately establishing communication between each of said cylinders and said inlet and outlet depressions, and inlet and outlet connections to said depressions.*

*25. In a fluid handling device, a casing having a peripheral wall and a pair of end plates, the inner faces of the end plates being provided with substantially crescent-shaped inlet and outlet depressions, one set of said depressions being in communication with the interior of said casing, means in said casing including a rotatable member of less diameter than said casing and forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, means for alternately establishing communication between each of said cylinders and said inlet and outlet depressions, and inlet and outlet connections to said depressions.*

*26. In a fluid handling device, a casing having a peripheral wall and a pair of end plates, the inner faces of the end plates being provided with substantially crescent-shaped inlet and outlet depressions, said outlet depressions being in communication with the interior of said casing, means in said casing including a rotatable member of less diameter than said casing and forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, means for alternately establishing communication between each of said cylinders and said inlet and outlet depressions, and inlet and outlet connections to said depressions.*

*27. In a hydraulic device, the combination of means including a rotatable member forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, means for varying the degree of eccentricity between said shafts, and inlet and outlet connections to said cylinders.*

*28. In a hydraulic device, a casing having a peripheral wall and a pair of end plates, the inner faces of the end plates being provided with substantially crescent-shaped inlet and outlet depressions, one set of said depressions being in communication with the interior of said casing, means in said casing including a rotatable member of less diameter than said casing and forming a plurality of cylinders, a shaft supporting one or more pistons for a corresponding number of said cylinders, a drive shaft eccentric to said first shaft carrying one or more pistons for a corresponding number of other of said cylinders and operative to drive the piston or pistons on said first shaft through the intermediary of said rotatable member and to drive the latter through the intermediary of the drive shaft pistons whereby to alternately expand and contract the cylinder spaces in the performance of useful work, means for alternately establishing communication between each of said cylinders and said inlet and outlet depressions, inlet and outlet connections to said depressions, means for adjusting the eccentricity of said shafts from a maximum position in one direction through an intermediate position of substantially no eccentricity to a maximum position in the opposite direction, and means for locking the adjusting means in various adjusted positions.*

GEORGE C. GRAHAM.

References Cited in the file of this patent or the original patent

UNITED STATES PATENTS

| Number | Name | Date |
|---|---|---|
| 562,500 | Sperry | June 23, 1896 |
| 1,352,953 | Grundy | Sept. 14, 1920 |
| 2,299,234 | Snader et al. | Oct. 20, 1942 |
| 2,406,138 | Ferris et al. | Aug. 20, 1946 |